United States Patent
Mashima et al.

(10) Patent No.: US 8,804,135 B2
(45) Date of Patent: Aug. 12, 2014

(54) METHOD OF AND APPARATUS FOR MEASURING ATTITUDE ANGLES OF A TONGUE WITH A FITTING FACE INVOLVING A PLURALITY OF ELECTRODES

(75) Inventors: Akio Mashima, Aikoh-gun (JP);
Kenichiro Nakano, Aikoh-gun (JP);
Shinichi Gotoh, Kamiina-gun (JP);
Yasushi Nasuno, Kamiina-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 13/608,488

(22) Filed: Sep. 10, 2012

(65) Prior Publication Data
US 2013/0088796 A1    Apr. 11, 2013

(30) Foreign Application Priority Data
Oct. 5, 2011    (JP) ................................. 2011-221053

(51) Int. Cl.
*G01B 11/14*    (2006.01)
(52) U.S. Cl.
USPC ........... 356/614; 356/153; 356/623; 356/337; 360/245.8

(58) Field of Classification Search
USPC ............... 356/152.1, 153, 623, 3.03, 337
See application file for complete search history.

(56) References Cited

U.S. PATENT DOCUMENTS

| | | | |
|---|---|---|---|
| 5,636,013 A * | 6/1997 | Swift | 356/3.03 |
| 6,747,267 B1 * | 6/2004 | Balasubramaniam | 356/369 |
| 6,985,332 B1 | 1/2006 | Sluzewski et al. | |
| 7,929,248 B2 | 4/2011 | Zhu et al. | |
| 2003/0211684 A1 * | 11/2003 | Guo | 438/230 |

FOREIGN PATENT DOCUMENTS

JP    2002-074630    3/2002

* cited by examiner

*Primary Examiner* — Gregory J Toatley
*Assistant Examiner* — Iyabo S Alli
(74) *Attorney, Agent, or Firm* — Jordan and Hamburg LLP

(57) ABSTRACT

A method of measuring attitude angles of a tongue of a head suspension, the tongue including a fitting face on which a plurality of electrodes are arranged, emits a single collimated laser beam to an area of a fitting face containing at least two of electrodes, detects a reflected beam from the fitting face, extracts electrode reflective components corresponding to the electrodes from the reflected beam, and according to the electrode reflective components, measures the attitude angles of the tongue.

8 Claims, 6 Drawing Sheets

METHOD OF AND APPARATUS FOR MEASURING ATTITUDE ANGLES OF A TONGUE WITH A FITTING FACE INVOLVING A PLURALITY OF ELECTRODES

BACKGROUND OF THE INVENTION

1. Field of the Invention

The present invention relates to a method of and an apparatus for measuring the attitude angles of a tongue of a head suspension installed in a hard disk drive, the tongue of the head suspension supporting a read/write head to read and write data from and to a disk driven in the hard disk drive.

2. Description of Related Art

When reading and writing data from and to the disk with the head suspension, the hard disk drive rotates the disk at high speed so that a slider, which is an element of the head suspension to hold the read/write head, slightly flies from the surface of the disk, To densely record data on the disk, the slider of the head suspension must realize a low fly height. For this, the slider must minimize variations in static attitude angles, i.e., pitch and roll angles. During the manufacturing of the head suspension, the pitch and roll angles of the slider are measured to see if they are within tolerances.

Measuring the pitch and roll angles of the slider is usually carried out by measuring, in a noncontact manner, the pitch and roll angles of the tongue of the head suspension to which the slider is attached. For example, Japanese Unexamined Patent Application Publication No. 2002-074630 uses a laser displacement gauge to emit laser beams to multiple spots on a flat metal surface of the tongue to which the slider is going to be attached, finds the heights of the spots according to reflected beams, and measures the pitch and roll angles of the tongue according to the heights. U.S. Pat. No. 6,747,267 uses an autocollimator to emit a laser beam to a single spot on the surface of the tongue, obtains the position of a reflected beam, and measures the pitch and roll angles of the tongue according to the position.

Each of these related arts employs reflected beams from the surface of the tongue, and therefore, requires the surface of the tongue to be exposed to laser beams, i.e., not to be covered with anything.

Recent hard disk drives are miniaturized and sophisticated and sliders used for them are provided with a variety of functions, e.g., a fly height control function with thermal expansion, a heat assist function against thermal fluctuation in magnetization, and a disk contact detection function using a sensor.

For these additional functions, the slider must have not only original read/write wiring but also additional function wiring, interleaved wiring, ground wiring, and the like. As a result, a tongue of a head suspension to which the high-function slider is attached must have an increased number of electrodes (pads) to connect the various kinds of wiring required for the slider. These electrodes are arranged on the surface of the tongue as explained in, for example, U.S. Pat. No. 6,985,332 and No. 7,929,248.

More precisely, the electrodes are arranged on an insulating layer formed on the surface of the tongue. Namely, the surface of the tongue is covered with the electrodes and insulating layer.

As a result, there is left little or no exposed space on the surface of the tongue to receive laser beams. This makes the measurement of pitch and roll angles according to the related arts unachievable.

The related art that measures the pitch and roll angles of a tongue with an autocollimator tries to minimize the diameter of a laser beam by choosing an aperture diameter and a laser frequency, This is to make the laser beam avoid patterns made by adhesives, wiring, and insulating layers on the tongue.

Even with such a laser beam of minimized diameter, it is hard to measure the pitch and roll angles of a tongue if the tongue has many electrodes used for a slider.

SUMMARY OF THE INVENTION

An object of the present invention is to provide a method and an apparatus capable of measuring the attitude angles of a tongue of a head suspension even if the tongue involves a plurality of electrodes used for a slider.

In order to accomplish the object, a first aspect of the present invention provides a method of measuring attitude angles of a tongue with a fitting face involving a plurality of electrodes are arranged for a slider. The method includes steps of emitting a single collimated beam to an area of the fitting face that contains at least two of the electrodes, extracting electrode reflective components from a reflected beam of the single collimated beam reflected by the area of the fitting thee, and measuring the attitude angles of the tongue according to the electrode reflective components.

A second aspect of the present invention provides an apparatus realizing the method of the first aspect. This apparatus includes an emission unit emitting a single collimated beam to a fitting face of a tongue, a sensing unit detecting a reflected beam from the fitting face of the tongue, and a processing unit extracting electrode reflective components from the reflected beam detected by the sensing unit, and according to the electrode reflective components, measuring the attitude angles of the tongue.

The first aspect of the present invention correctly measures the attitude angles of a tongue of a head suspension even if a fitting face of the tongue to which a slider is attached involves many electrodes used for the slider.

The second aspect of the present invention is capable of easily achieving the method of the first aspect.

DETAILED DESCRIPTION OF EMBODIMENTS

An embodiment of the present invention will be explained. The embodiment correctly measures the attitude angles of a tongue of a head suspension even if a fitting face of the tongue to which a slider is attached involves a plurality of electrodes used for the slider. The embodiment emits a single collimated beam to an area of the fitting face of the tongue that contains at least two of the electrodes, extracts electrode reflective components from a reflected beam of the single collimated beam reflected by the area of the fitting face, and measures the attitude angles of the tongue according to the electrode reflective components.

More precisely, the embodiment individually measures the attitude angles of the electrode reflective components, averages the measured attitude angles, and provides the averaged attitude angles as the attitude angles of the tongue.

Extracting the electrode reflective components may be carried out by forming an image of the tongue according to the reflected beam and by processing the image.

The collimated beam is a laser beam that may preferably be a blue laser beam or a violet laser beam.

Hereinafter, the embodiment of the present invention will be explained in detail with reference to the drawings.

Figure 1:
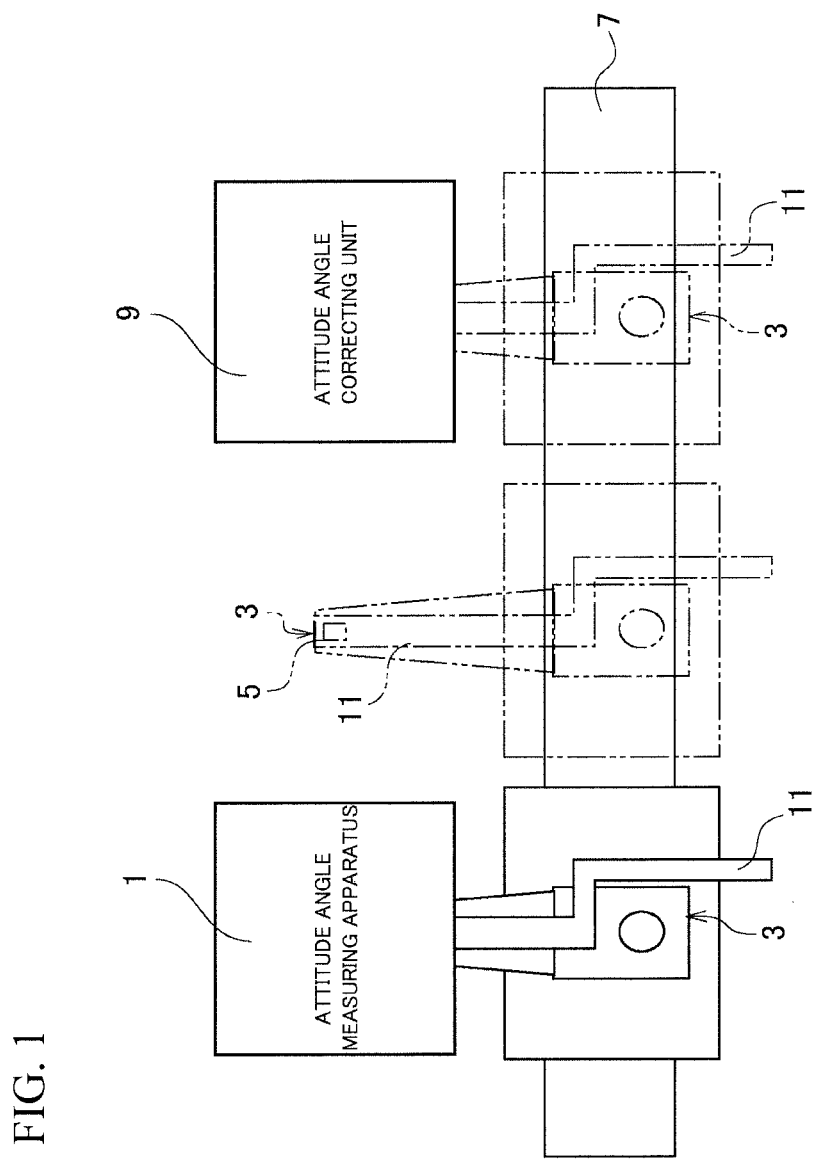
FIG. 1 is a block diagram illustrating an apparatus for measuring attitude angles and relevant components according to an embodiment of the present invention as well as a head suspension.

FIG. 1 is a block diagram schematically illustrating an apparatus for measuring attitude angles and relevant components according to an embodiment of the present invention as well as a head suspension.

in FIG. 1, the attitude angle measuring apparatus 1 measures, in a noncontact manner, the static attitude angles, i.e., pitch and roll angles of a tongue 5 of the head suspension 3. The head suspension 3 is supplied to the apparatus 1 with a convey line 7.

Along the convey line 7, there are arranged the attitude angle measuring apparatus 1 and an attitude angle correcting unit 9. To the unit 9, the head suspension 3 is supplied after the measurement of the pitch and roll angles of the tongue 5 conducted by the attitude angle measuring apparatus 1. If the measured pitch and roll angles of the tongue 5 are larger than tolerances, the unit 9 corrects the angles with, for example, laser beams so that the angles fall within the tolerances.

Figure 2:
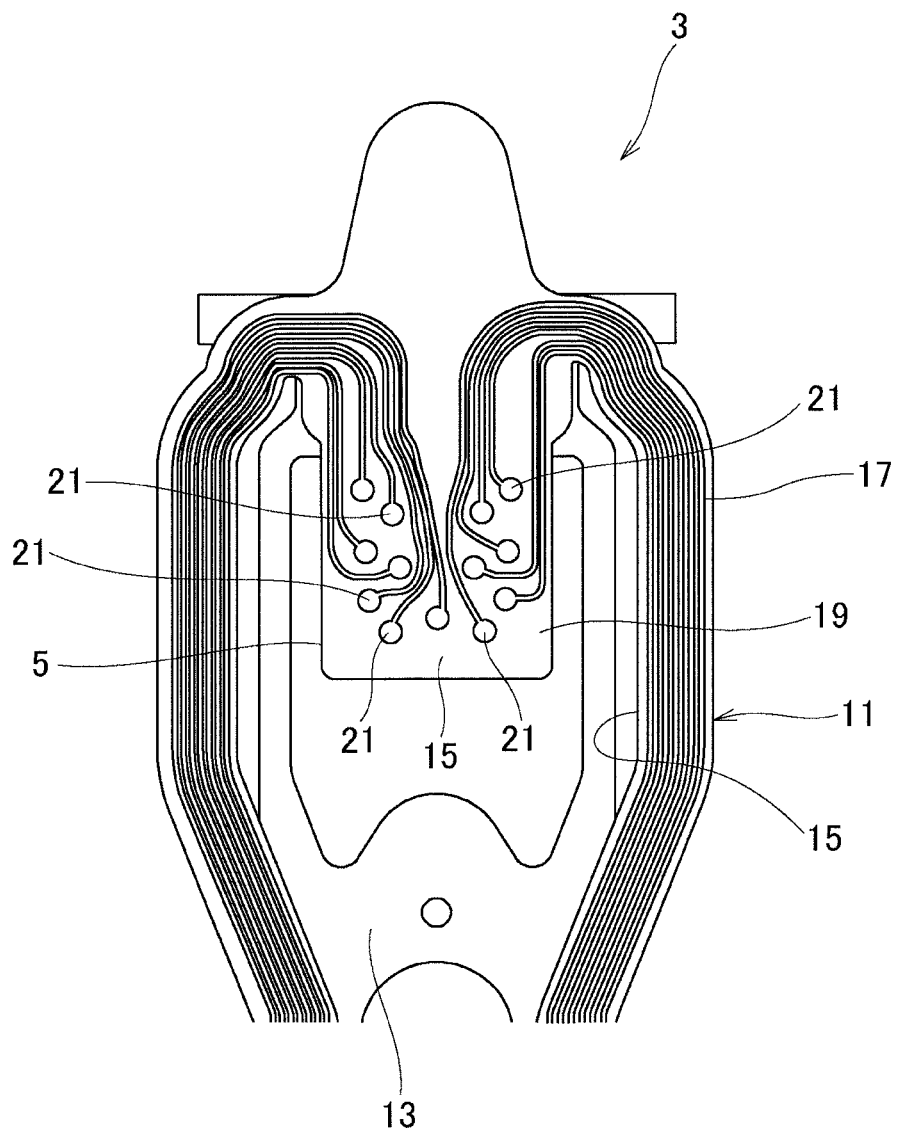
FIG. 2 is a plan view illustrating a tongue as an object to be measured and the surrounding area of the head suspension of FIG. 1.

FIG. 2 is plan view illustrating the tongue 5 as the object to be measured and the surrounding area of the head suspension 3.

In FIGS. 1 and 2, the head suspension 3 includes a flexure 11 and the tongue 5 that is arranged at a front end of the flexure 11 and supports a slider (not illustrated). The slider is provided with a fly height control function based on thermal expansion, a heat assist function against thermal fluctuation in magnetization, a disk contact detection function using a sensor, and the like.

The flexure 11 includes a metal base 13 made oh for example, stainless steel. Around the tongue 5, the flexure 11 has an insulating layer 15 formed on the metal base 13 and a wiring pattern 17 arranged on the insulating layer 15. The wiring pattern 17 includes a plurality of wires such as slider function wires, interleaved wires, and ground wires and is extended from the front end of the flexure 11 to a base end thereof illustrated in FIG. 1. The wiring pattern 17 is covered with a cover insulating layer (not illustrated) made of polyimide.

The tongue 5 of the flexure 11 is formed like a cantilever and has a fitting face 19 to which the slider is attached. The fitting face 19 is covered with the insulating layer 15 on which a plurality of electrodes (pads) 21 used for the slider are arranged. According to the embodiment, the surface of the tongue 5 is entirely covered with the insulating layer 15 and the electrodes 21 are distributed over the insulating layer 15. The electrodes 21 are connected to ends of the wires of the wiring pattern 17, respectively.

Figure 3:
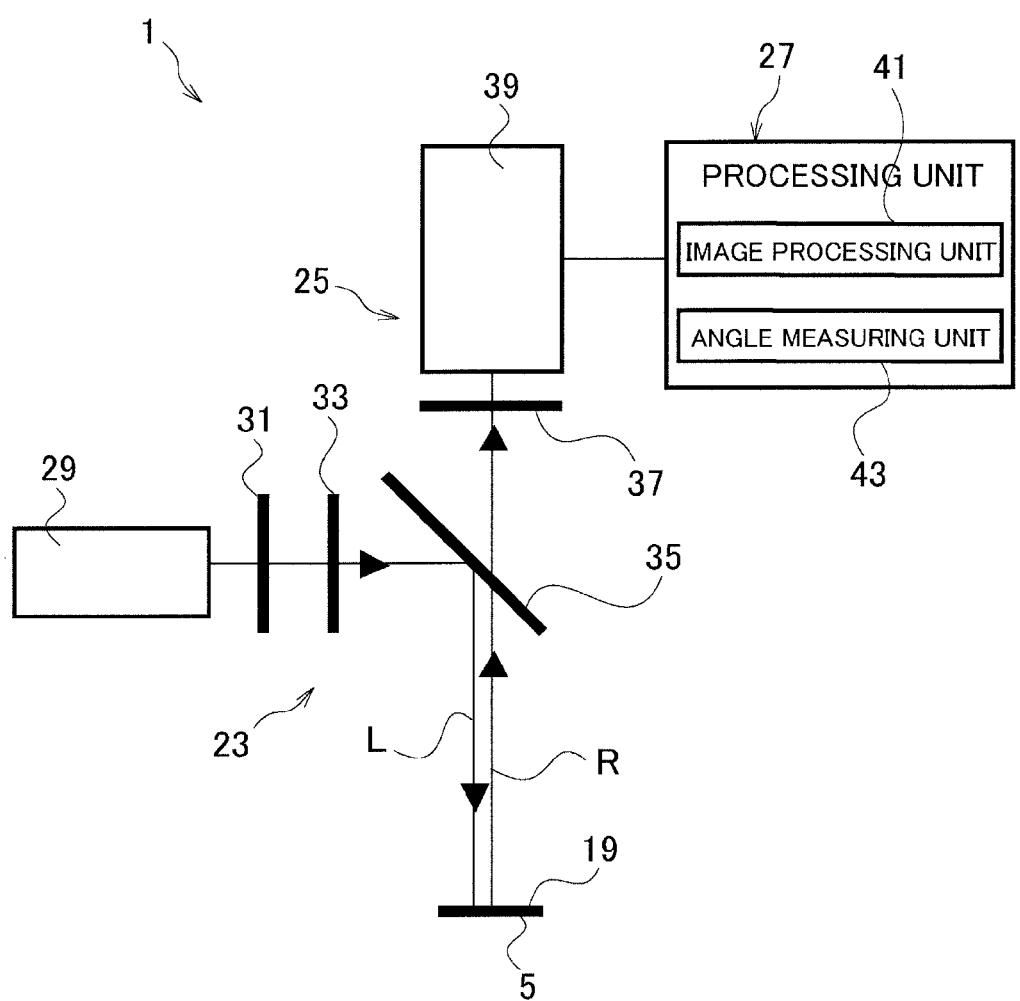
FIG. 3 is a schematic view illustrating the attitude angle measuring apparatus of FIG. 1.

FIG. 3 is a schematic view illustrating the attitude angle measuring apparatus 1 of FIG. 1.

In FIG. 3, the attitude angle measuring apparatus 1 includes a laser emission unit 23, a laser sensing unit 25, and a processing unit 27.

The laser emission unit 23 emits a laser beam L as a collimated beam to the fitting face 19 of the tongue 5 and includes a laser oscillator 29, a first polarizing plate 31, an aperture 33, and a beam splitter 35.

The laser oscillator 29 is, for example, a semiconductor laser oscillator to emit a red laser beam, a blue laser beam, or a violet laser beam. The laser oscillator 29 incorporates a light source (not illustrated) and a collimator lens (not illustrated) that is arranged on an optical axis of the light source and emits the collimated laser beam L. The laser beam L is nearly a circular beam corrected from an elliptic beam characteristic to the semiconductor laser oscillator. The laser beam L from the laser oscillator 29 passes through the first polarizing plate 31.

The first polarizing plate 31 is, for example, a quarter wave plate and is arranged in an optical path of the laser beam L, to transmit the laser beam L and remove noise. The first polarizing plate 31 may be omitted. The laser beam L from the first polarizing plate 31 passes through the aperture 33.

The aperture 33 is positioned in the optical path of the laser beam L and has a variable or fixed diameter. The diameter of the aperture 33 determines the diameter of the laser beam L passing therethrough. The diameter of the aperture 33 is optional and is set according to the size of the tongue 5 or the size of an area of the tongue 5 to be irradiated with the laser beam. According to the embodiment, the diameter of the aperture 33 is set to about 0.8 mm to 1.0 mm, so that the laser beam L entirely irradiates the tongue 5 and does not irradiate the outside of the tongue 5.

The laser beam L from the aperture 33 passes through the beam splitter 35 and irradiates the tongue 5.

The beam splitter 35 is, for example, a half-mirror that deflects and reflects the laser beam L from the aperture 33 toward the tongue 5. Also, the beam splitter 35 transmits a reflected beam R from the tongue 5 toward the laser sensing unit 25.

The laser sensing unit 25 includes a second polarizing plate 37 and an angle detection camera 39.

The second polarizing plate 37 is, for example, a quarter wave plate and is arranged in an optical path of the reflected beam R, to transmit the reflected beam R and remove noise. Like the first polarizing plate 31, the second polarizing plate 37 may be omitted. If the second polarizing plate 37 is omitted, it is preferable not to omit the first polarizing plate 31, and if the first polarizing plate 31 is omitted, it is preferable not to omit the second polarizing plate 37, The reflected beam R from the second polarizing plate 37 is picked up by the angle detection camera 39.

The angle detection camera 39 is, for example, a CCD camera to form an image of the reflected beam R from the tongue 5 on a photosensitive surface. The camera 39 converts the image into an electric signal and outputs the electric signal to the processing unit 27.

The processing unit 27 is an information processing unit such as a computer. The processing unit 27 executes programs stored in a memory (not illustrated), to realize an image processing unit 41 and an angle measuring unit 43.

The image processing unit 41 forms an image of the reflected beam R according to the electric signal from the angle detection camera 39 and carries out an image process, i.e., a filtering process on the image.

The filtering process forms, from the image of the reflected beam R, an image of electrode reflective components corresponding to the electrodes 21 of the tongue 5. Namely, the processing unit 27 extracts the electrode reflective components reflected at all or some of the electrodes 21 from the reflected beam R detected by the laser sensing unit 25.

The filtering process may be a known filtering process that picks up pixels having brightness levels between lower and upper limits from a given image and discards the other pixels from the image. The lower and upper limits are determined according to tests, so that reflective components of electrodes are surely picked up. The lower and upper limits must be set to exclude electrode reflective components having excessively high or low brightness levels. This is to avoid an erroneous detection of an electrode reflective component having an excessive brightness level that corresponds to a reflective component other than the electrode.

The angle measuring unit 43 measures the pitch and roll angles (attitude angles) of the tongue 5 according to the extracted electrode reflective components. Namely, the angle measuring unit 43 individually measures the pitch and roll angles of each electrode reflective component according to the position of the electrode reflective component in the image of electrode reflective components.

This measurement may he carried out by referring to a table of correlation between the position of an electrode reflective component and the pitch and roll angles thereof. The table is prepared in advance.

The angle measuring unit 43 averages the pitch and roll angles of all of the electrode reflective components and provides the averaged pitch and roll angles as the measured pitch and roll angles (attitude angles) of the tongue 5.

A method of measuring pitch and roll angles according to an embodiment of the present invention will be explained. The method is carried out by the attitude angle measuring apparatus 1 illustrated in FIG. 1.

Figure 4:
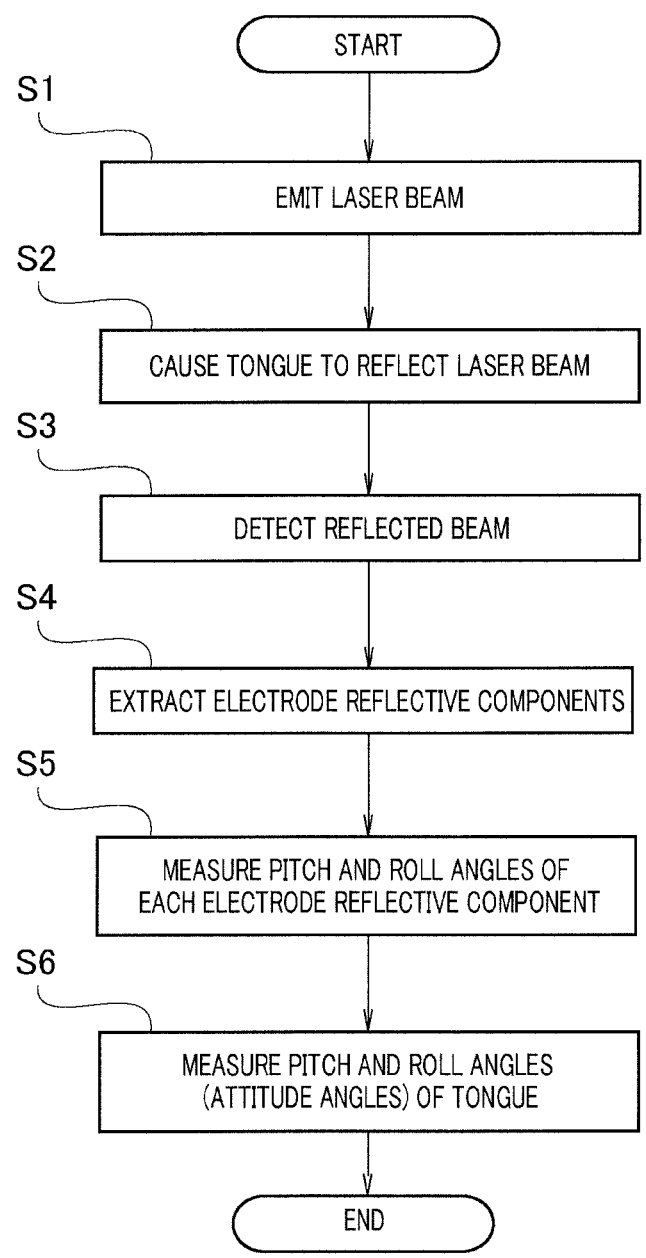
FIG. 4 is a flowchart illustrating a method of measuring attitude angles of the tongue of FIG. 2, according to an embodiment of the present invention.
Figure 5:
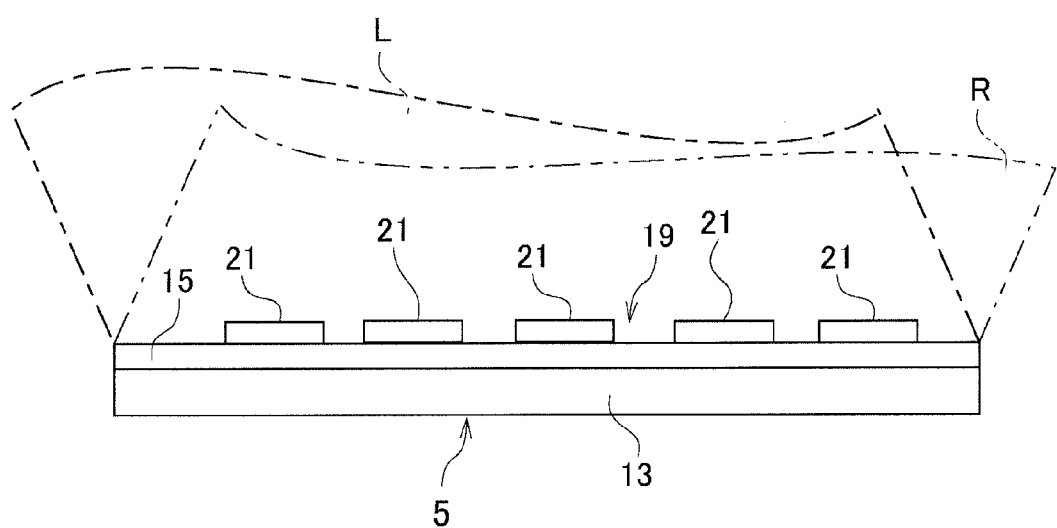
FIG. 5 is a schematic view illustrating a laser beam and reflected beam to and from the tongue of FIG. 2, according to the method of FIG. 4.
Figure 6:
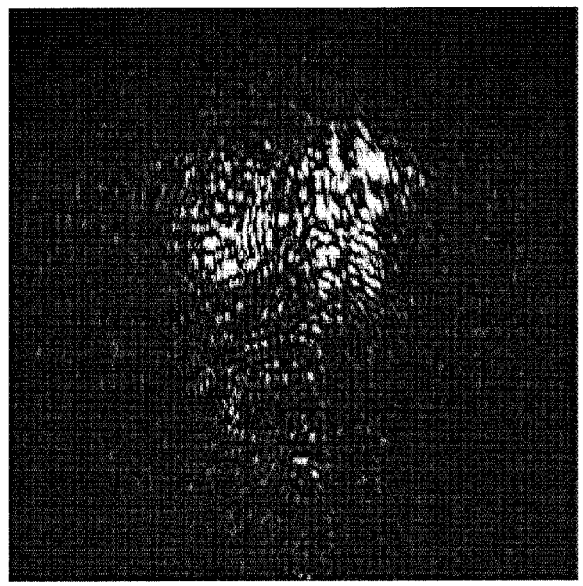
FIG. 6 is an image picked up from the reflected beam from the tongue according to the method of FIG. 4.
Figure 7:
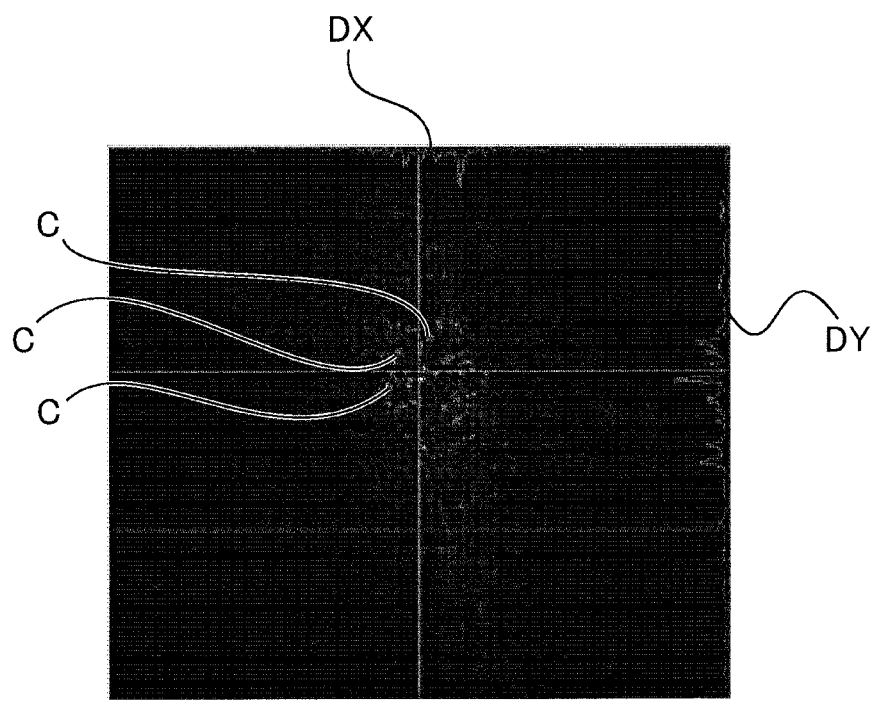
FIG. 7 is an image processed from the image of FIG. 6 and illustrating electrode reflective components corresponding to electrodes of the tongue.

FIG. 4 is a flowchart illustrating the method of measuring attitude angles (pitch and roll angles) of the tongue 5 of FIG. 2, FIG. 5 is a schematic view illustrating a laser beam and reflected beam to and from the tongue 5, FIG. 6 is an image picked up from the reflected beam from the tongue 5, and FIG. 7 is an image processed from the image of FIG. 6 and illustrating electrode reflective components corresponding to some of the electrodes 21 of the tongue 5.

The method feeds, on the convey line 7 of FIG. 1, the head suspension 3 to be measured to the attitude angle measuring apparatus 1 and starts the flowchart of FIG. 4.

Step S1 of FIG. 4 emits a laser beam. As illustrated in FIG. 3, the laser oscillator 29 of the laser emission unit 23 emits a laser beam L. The laser beam passes through the first polarizing plate 31, aperture 33, and beam splitter 35 and irradiates the fitting face 19 of the tongue 5.

According to the embodiment, the diameter of the laser beam L is set to entirely irradiate the tongue 5 as mentioned above. Namely, the single laser beam L irradiates the whole area of the fitting face 19 of the tongue 5 including all of the electrodes (pads) 21 as illustrated in FIG. 5. It is not always necessary to irradiate the area containing all of the electrodes 21. For example, the area to be irradiated with the laser beam L may be set not to contain relatively small electrodes that provide weak reflected beams. More precisely, it is sufficient if the laser beam L irradiates an area of the tongue 5 that contains at least two of the electrodes 21. in step S2, the fitting face 19 of the tongue 5 reflects the laser beam L as illustrated in FIG. 5, to provide a reflected beam R that is from the whole area of the fitting face 19 of the tongue 5.

If the laser beam L is a red laser beam, the wiring pattern 17 that is on and around the fitting face 19 and is covered with the cover insulating layer made of polyimide provides slight reflective light that causes noise.

if the laser beam is a blue or violet laser beam, such slight reflective light will be suppressed to reduce noise. This is because the transmissivity of a laser beam with respect to the cover insulating layer is dependent on the wavelength of the laser beam, and depending on the transmissivity with respect to the cover insulating layer, noise to be generated varies.

Accordingly, the material of the cover insulating layer of the wiring pattern 17 and the wavelength (color) of the laser beam to irradiate the tongue 5 are properly chosen to reduce noise to be contained in the reflected beam R.

Step S3 senses the reflected beam R. The reflected beam R from the tongue 5 passes through the beam splitter 35 and second polarizing plate 37 and is picked up by the angle detection camera 39 of the laser sensing unit 25 as illustrated in FIG. 3. The camera 39 converts the picked-up image into an electric signal and sends the electric signal to the processing unit 27.

Step S4 extracts electrode reflective components. Namely, according to the electric signal from the angle detection camera 39, the image processing unit 41 of the processing unit 27 forms an image of the reflected beam R as illustrated in FIG. 6 and carries out a filtering process to extract electrode reflective components C and form an electrode reflective image as illustrated in FIG. 7. in FIG. 7, the extracted electrode reflective components C are represented together with brightness distributions DX and DY on X- and Y-axes.

The filtering process to form the electrode reflective image of FIG. 7 employs thresholds to exclude electrode reflective components having extremely high or low brightness levels. At this time, reflective components irrelevant to the electrodes (pads) 21 are also excluded, so that reflective components from, for example, nonplanar locations of the wiring pattern 17 may not erroneously be detected as electrode reflective components.

Step S5 measures the pitch and roll angles of each electrode. The angle measuring unit 43 of the processing unit 27 receives the electrode reflective image from the image processing unit 41, and according to the position of each electrode reflective component C, measures the pitch and roll angles of the electrode reflective component C.

More precisely, the angle measuring unit 43 detects the position of each electrode reflective component C illustrated in FIG. 7 on the X- and Y-axes, According to the position, the angle measuring unit 43 refers to the correlation table to find the pitch and roll angles of the given electrode reflective component C. The electrodes 21 vary in surface shape and inclination, and therefore, the found pitch and roll angles of the electrode reflective component C involve fluctuations.

Step S6 measures general pitch and roll angles. Namely, the angle measuring unit 43 averages the pitch and roll angles of all electrode reflective components C and provides the averaged pitch and roll angles as the attitude angles of the tongue 5. Averaging the measured pitch and roll angles of all electrode reflective components C results in reducing or negating variations or fluctuations among the measured pitch and roll angles.

After step S6 the measuring of the attitude angles (pitch and roll angles) of the tongue 5 ends. Thereafter, the measured attitude angles are tested if they are within tolerances.

Effects of the method of and apparatus for measuring attitude angles according to the present invention will be explained.

The method of measuring attitude angles measures the pitch and roll angles of the tongue 5 of the head suspension 3. The tongue 5 has the fitting face 19 to which the data read/write slider is attached. On the fitting face 19, there is the insulating layer 15 on which the electrodes (pads) 21 used for the slider are arranged. The method emits a single collimated laser beam L to an area of the fitting face 19 containing at least two of the electrodes 21, detects a reflected beam R from the fitting face 19, extracts electrode reflective components C corresponding to the electrodes 21 from the reflected beam R, and according to the electrode reflective components C, measures the pitch and roll angles (attitude angles) of the tongue 5.

The method is capable of correctly measuring the pitch and roll angles of the tongue 5 even if the fitting face 19 of the tongue 5 involves a plurality of electrodes 21 used for the slider.

The method emits the laser beam L to an area of the fitting face 19 containing at least two of the electrodes 21. Accordingly, the laser beam L may have a relatively large diameter that is easy to manage. Enlarging the diameter of the laser beam L is realized only by increasing the diameter of the aperture 33.

The method measures the pitch and roll angles of each electrode 21 according to an electrode reflective component C corresponding to the electrode 21 and averages the pitch and roll angles of all individually-measured electrode reflective components C, to find the pitch and roll angles of the tongue 5.

In this way, the method conducts a multi-spot measurement to easily and correctly measure the pitch and roll angles of the tongue 5 like a technique that conducts a single-spot measurement with the use of a collimator.

Averaging the measured pitch and roll angles of the electrode reflective components C reduces or negates variations or fluctuations among the pitch and roll angles of the individual electrodes 21 on the fitting face 19 of the tongue 5, and therefore, improves the correctness of the measured pitch and roll angles of the tongue 5.

Extracting the electrode reflective components C by forming an image from the reflected beam R and by processing the image is easy to carry out and is secure.

The head suspension 3 has the wiring pattern 17 that is connected to the electrodes 21 and is covered with the cover insulating layer made of polyimide. If the collimated laser beam L is a blue or violet laser beam, reflection from the wiring pattern 17 covered with a cover insulating layer on the fitting face 19 or the surrounding area thereof will be suppressed to reduce noise. This results in more easily and surely extracting the electrode reflective components C.

The attitude angle measuring apparatus 1 includes the laser emission unit 23 to emit a collimated laser beam L to the fitting face 19 of the tongue 5, the laser sensing unit 25 to detect a reflected beam R from the tongue 5, and the processing unit 27 to extract electrode reflective components C from the reflected beam R from the laser sensing unit 25, and according to the electrode reflective components C, measure the pitch and roll angles of the tongue 5.

The attitude angle measuring apparatus 1 is capable of easily achieving the attitude angle measuring method mentioned above.

What is claimed is:

1. A method of measuring static attitude angles of a tongue of a head suspension, the tongue having a fitting face to which a slider is attached, an insulating layer formed on the fitting face, and a plurality of electrodes arranged on the insulating layer and used for the slider, the method comprising steps of:

emitting a single collimated beam to an area of the fitting face that contains at least two of the electrodes so that the area of the fitting face is once irradiated with the single collimated beam and said at least two of the electrodes are positioned in a range of a diameter of the single collimated beam at the time of said once irradiating;

extracting electrode reflective components of the electrodes that have been positioned in the range of the diameter of the single collimated beam at the time of said once irradiating from a reflected beam of the single collimated beam reflected by the area of the fitting face; and measuring the static attitude angles of the tongue according to the electrode reflective components.

2. The method of claim 1, wherein the measuring step measures static attitude angles of each of the extracted electrode reflective components, averages the measured static attitude angles of the extracted electrode reflective components, and provides the averaged static attitude angles as the static attitude angles of the tongue.

3. The method of claim 1, wherein the extracting step is carried out by forming an image of the reflected beam and processing the image.

4. The method of claim 1, wherein the head suspension has a wiring pattern that is connected to the electrodes and is covered with a cover insulating layer, and a wavelength of the single collimated beam and a material of the cover insulating layer are chosen to suppress reflection of the collimated beam from the wiring pattern.

5. The method of claim 4, wherein the cover insulating layer is made of polyimide and the collimated beam is one of blue and violet laser beams.

6. An apparatus for measuring static attitude angles of a tongue of a head suspension, the tongue having a fitting face to which a slider is attached, an insulating layer formed on the fitting face, and a plurality of electrodes arranged on the insulating layer and used for the slider, the apparatus carrying out the method of claim 1 and comprising:

an emission unit emitting a single collimated beam to the fitting face of the tongue;

a sensing unit detecting a reflected beam from the fitting face of the tongue; and a processing unit extracting electrode reflective components from the reflected beam detected by the sensing unit, and according to the electrode reflective components, measuring the static attitude angles of the tongue.

7. A method of measuring static attitude angles of a tongue of a head suspension, the tongue having a fitting face to which a slider is attached, an insulating layer formed on the fitting face, and a plurality of electrodes arranged on the insulating layer and used for the slider, the method comprising steps of:

emitting a single collimated beam having a cross sectional area at least as large as an area of the fitting face occupied by at least two of the plurality of electrodes;

irradiating said area of the fitting face with the emitted single collimated beam so as to commonly irradiate said at least two of the plurality of electrodes with the emitted single collimated beam;

extracting electrode reflective components of the electrodes that have been positioned in the range of the diameter of the single collimated beam at the time of irradiation from a reflected beam of the single collimated beam reflected by the area of the fitting face; and measuring the static attitude angles of the tongue according to the electrode reflective components.

8. The method of claim 1, wherein said emitting comprises emitting the single collimated beam having the cross sectional area that is at least as large as an entire area of the fitting face including at said plurality of electrodes so as to concurrently irradiate every one of said the plurality of electrodes with the emitted single collimated beam when said entire area of the fitting face is irradiated.

\* \* \* \* \*